US008224543B2

(12) United States Patent
Kawamoto (10) Patent No.: US 8,224,543 B2
(45) Date of Patent: Jul. 17, 2012

(54) SHIFT POSITION DETECTING DEVICE FOR GEAR SELECTION MECHANISM OF AUTOMOTIVE TRANSMISSION

(75) Inventor: Yoshinobu Kawamoto, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 875 days.

(21) Appl. No.: 12/267,148

(22) Filed: Nov. 7, 2008

(65) Prior Publication Data

US 2009/0150033 A1  Jun. 11, 2009

(30) Foreign Application Priority Data

Dec. 5, 2007 (JP) .................................. 2007-314397
Jul. 16, 2008 (JP) .................................. 2008-184356

(51) Int. Cl.
G06F 7/00 (2006.01)
G06F 17/00 (2006.01)
G06F 19/00 (2011.01)

(52) U.S. Cl. ............................... 701/64; 701/58; 701/60

(58) Field of Classification Search ........................ None
See application file for complete search history.

(56) References Cited

U.S. PATENT DOCUMENTS 5,743,143 A * 4/1998 Carpenter et al. ............... 74/335
6,067,495 A * 5/2000 Fliearman et al. .............. 701/55
2005/0143220 A1* 6/2005 Berger et al. .................... 477/96
2007/0028709 A1* 2/2007 Futamura et al. ............... 74/335

FOREIGN PATENT DOCUMENTS

EP         1 750 040 A1   2/2007
JP       2007-40407 A     2/2007

* cited by examiner

Primary Examiner — Khoi Tran
Assistant Examiner — Bhavesh V Amin
(74) Attorney, Agent, or Firm — Foley & Lardner LLP (57) ABSTRACT

A shift position detecting device comprises a shift position sensor that continuously issues an output data that represents a shift position of the gear selection mechanism; and a control unit. The control unit includes a first shifting load instruction section that controls the shift actuator to shift the gear selection mechanism to the shift gear-in establishing position with a first shifting load; a second shifting load instruction section that, after completion of shifting of the gear selection mechanism to the shift gear-in establishing position by the first shifting load instruction section, controls the shift actuator to reduce the shifting load from the first shifting load to a second shifting load which is lower than the first shifting load; and a shift gear-in establishing position memory section that stores an output data issued from the shift position sensor when the shift actuator is controlled by the second shifting load instruction section, as an information data that represents completion of shifting of the gear selection mechanism to the shift gear-in establishing position.

18 Claims, 6 Drawing Sheets

SHIFT POSITION DETECTING DEVICE FOR GEAR SELECTION MECHANISM OF AUTOMOTIVE TRANSMISSION

BACKGROUND OF THE INVENTION

Field of the Invention

The present invention relates in general to shift position detecting devices for automotive transmissions and more particularly to the shift position detecting devices of a type that is suitable for detecting the shift position taken by a gear selection mechanism employed in automatic-manual transmissions (AMT) or the like.

In the automatic-manual transmissions, both selecting and shifting operations of a manual transmission (MT) are carried out automatically.

One of such automatic-manual transmissions is disclosed in Japanese Laid-open Patent Application (Tokkai) 2007-040407.

In the transmission of the Laid-open Application, speeds (or gear rows) provided by the transmission are classified into a plurality of speed groups, and each speed group is provided with a clutch for inputting an engine rotation individually. Usually, the classified speed groups are two groups that comprise odd number speeds and even number speeds.

That is, when, in operation, it is intended to select the first speed for starting the vehicle, a synchronizing coupling mechanism for the speed group that includes the first speed is shifted (or pre-shifted) by a shift actuator from a neutral position to a first speed selection position (viz., first speed shift gear-in establishing position) keeping the clutches of both speed groups disengaged, and then the clutch for the speed group that includes the first speed is engaged. With these steps, the gear row for the first speed is established and thus the first speed is provided by the transmission.

During the above-mentioned pre-shifting to the first speed, a synchronizing coupling mechanism for the speed group that includes the second speed is shifted (or pre-shifted) by a corresponding shift actuator from a neutral position to a second speed selection position (viz., second speed shift gear-in establishing position). That is, the pre-shifting to the first speed and the pre-shifting to the second speed are carried out simultaneously.

When it is intended to make an up-shifting from the first speed to the second speed, the clutch for the speed group that includes the second speed is controlled to start its engaging operation, and when the engaging operation of the clutch is advanced by a certain degree, the clutch for the speed group that includes the first speed is disengaged, so that the speed change from the first speed to the second speed is carried out by the switching control for the two clutches.

When, after completion of the speed change from the first speed to the second speed, a synchronizing coupling mechanism for the speed group that includes the third speed is shifted (or pre-shifted) by a corresponding shift actuator from a neutral position to a third speed selection position (viz., third speed shift gear-in establishing position). That is, a pre-shifting to the third speed is carried out.

When it is intended to make an up-shifting from the second speed to the third speed, the clutch for the speed group that includes the third speed is controlled to start its engaging operation, and when the engaging operation of the clutch is advanced by a certain degree, the clutch for the speed group that includes the second speed is disengaged, so that the speed change from the second speed to the third speed is carried out by the switching control for the two clutches.

When, after completion of the speed change from the second speed to the third speed, a synchronizing coupling mechanism for the speed group that includes the fourth speed is shifted (or pre-shifted) by a corresponding shift actuator from a neutral position to a fourth speed selection position (viz., fourth speed shift gear-in establishing position). That is, a pre-shifting to the fourth speed is carried out.

By making similar switching control for two clutches and similar pre-shifting, an up-shifting from the third speed to the fourth speed, an up-shifting from the fourth speed to the fifth speed or an up-shifting from the fifth speed to the sixth speed is carried out.

For making a down-shifting from the sixth speed toward the first speed in due order through the fifth speed, the fourth speed, the third speed and the second speed, similar but reversed switching control for two clutches and similar pre-shifting are carried out. That is, by making similar switching control for two clutches and similar pre-shifting, a predetermined down-shifting for speeds is carried out.

SUMMARY OF THE INVENTION

In order to control the automatic-manual transmission of the above-mentioned type, it is necessary to accurately detect the shift position taken by each of the synchronizing coupling mechanisms (or gear selection mechanisms).

For such shift position detection, the above-mentioned Laid-open Patent Application discloses a shift position detecting device of magnetically coupled type which comprises a permanent magnet that moves together with the synchronizing coupling mechanism and a magnetic sensor that senses a magnetic flux produced by the permanent magnet.

However, for obtaining a satisfied performance, the shift position detecting device shown by the publication needs a skilled technique for assembling the device and mounting the device to a given position of the transmission, which causes increase in cost of the transmission. If the device is inaccurately assembled and/or inaccurately mounted to the transmission, satisfied performance of the device is not expected.

One measure may be thought out for solving the above-mentioned shortcomings. That is, in the measure, with the work of the corresponding shift actuator, the synchronizing coupling mechanism is shifted to the shift gear-in establishing position, and an output data issued from the magnetic sensor when the synchronizing coupling mechanism comes to the shift gear-in establishing position is taken as a sign (or information data) for completion of shifting of the coupling mechanism to the shift gear-in establishing position. By using this measure, various output data are obtained for respective shift positions, and a data map is provided that shows a relation between the output data and the shift positions. With reference to the data map, a shift position can be looked up from a certain output data.

Accordingly, in such measure, correlation of the shift gear-in establishing position of the synchronizing coupling mechanism with the output data issued from the magnetic sensor when the synchronizing coupling mechanism comes to such establishing position should be accurately provided. If the correlation is inaccurately provided, the map produced fails to show an accurate relation between the output data and the shift positions. Of course, in this case, exact detection of shift position is not expected.

Furthermore, when the synchronizing coupling mechanism is shifted to the shift gear-in establishing position, a magnet holding structure through which the permanent magnet is connected to the shift actuator is subjected to warping. Accordingly, even when the synchronizing coupling mechanism comes to the shift gear-in establishing position, the permanent magnet fails to take the right position due to the warping of the magnet holding structure, and thus, the output data of the magnetic sensor fails to indicate the correct value for the shift gear-in establishing position.

Furthermore, the degree of warping of the magnet holding structure differs or varies depending on the individual difference of each transmission.

These undesired facts lower or deteriorate the correlation of the shift gear-in establishing position of the synchronizing coupling mechanism with the output data detected by the sensor when the synchronizing coupling mechanism comes to such establishing position. That is, with such warping, accurate detection of shift position from the data map is not expected.

Accordingly, it is an object of the present invention to provide a shift position detecting device for a gear selection mechanism of an automotive transmission, which is free of the above-mentioned drawbacks.

That is, in the shift position detecting device according to the present invention, a warping of the magnet holding structure, which is inevitably induced when a gear selection mechanism is shifted to a shift gear-in establishing position, has no effect on detecting exact shift position, and correlation of the shift gear-in establishing position of the gear selection mechanism with the output data issued from the magnetic sensor when the synchronizing coupling mechanism comes to such establishing position is accurately provided. With these advantages, the above-mentioned shortcomings are solved.

In accordance with a first aspect of the present invention, there is provided a shift position detecting device for use in an automotive transmission having a gear selection mechanism for each gear train, the gear selection mechanism being shifted to a shift gear-in establishing position by a corresponding shift actuator thereby to select the gear train as a power transmission gear train. The position detecting device comprises a shift position sensor that continuously issues an output data that represents a shift position of the gear selection mechanism; and a control unit which includes a first shifting load instruction section that controls the shift actuator to shift the gear selection mechanism to the shift gear-in establishing position with a first shifting load; a second shifting load instruction section that, after completion of shifting of the gear selection mechanism to the shift gear-in establishing position by the first shifting load instruction section, controls the shift actuator to reduce the shifting load from the first shifting load to a second shifting load which is lower than the first shifting load; and a shift gear-in establishing position memory section that stores an output data issued from the shift position sensor when the shift actuator is controlled by the second shifting load instruction section, as an information data that represents completion of shifting of the gear selection mechanism to the shift gear-in establishing position.

In accordance with a second aspect of the present invention, there is provided a method of detecting a shift gear-in establishing position in an automotive transmission including a gear selection mechanism for each gear train, the gear selection mechanism being shifted to the shift gear-in establishing position by a corresponding shift actuator thereby to select the gear train as a power transmission gear train, and a shift position sensor that continuously issues an output data that represents a shift position of the gear selection mechanism. The method comprises controlling the shift actuator to shift the gear selection mechanism to the shift gear-in establishing position with a first shifting load; after completion of shifting of the gear selection mechanism to the shift gear-in establishing position by the first shifting load, controlling the shift actuator to reduce the shifting load from the first shifting load to a second shifting load which is lower than the first shifting load; and storing an output data issued from the shift position sensor when the shift actuator is controlled by the second shifting load, as an information data that represents completion of shifting of the gear selection mechanism to the shift gear-in establishing position.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, embodiments of the present invention will be described in detail with reference to the accompanying drawings.

For ease of understanding, various directional terms, such as, right, left, upper, lower, rightward and the like are used in the following description. However, such terms are to be understood with respect to only a drawing or drawings on which a corresponding element or portion is shown.

Figure 1:
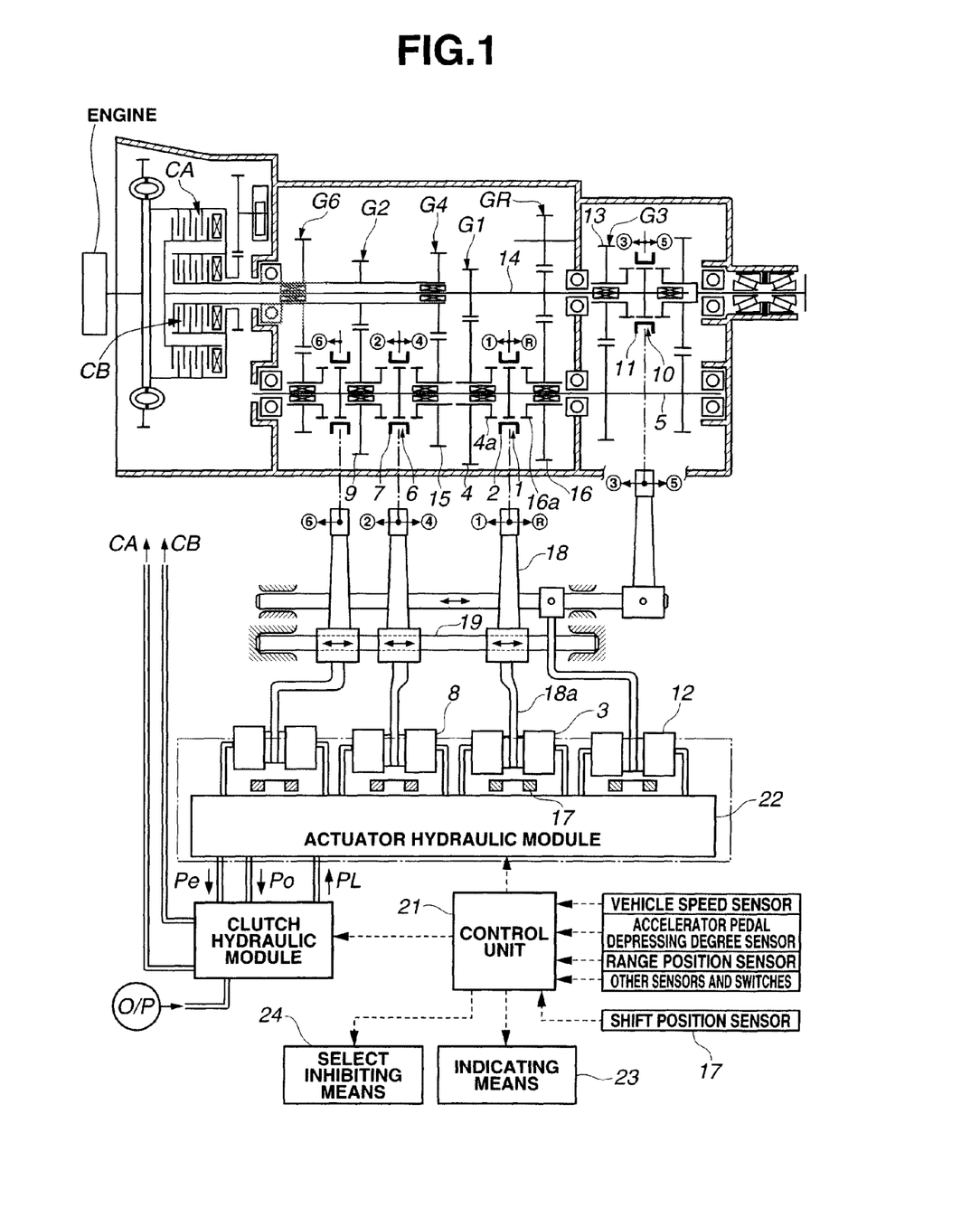
FIG. 1 is a sectional view of a twin clutch automatic-manual transmission with a speed change control system, to which a shift position detecting device of a first embodiment of the present invention is practically applied.

Referring to FIG. 1, there is shown a twin clutch automatic-manual transmission with a speed change control system, to which a shift position detecting device of a first embodiment of the present invention is practically applied.

The twin clutch automatic-manual transmission and the speed change control system shown in FIG. 1 are substantially same in mechanical construction as those shown in the above-mentioned Japanese Laid-open Patent Application (Tokkai) 2007-040407. Thus, detailed description of the mechanical construction will be omitted in the following description.

However, for the aid of easy understanding of the invention, an automatic speed change operation of the transmission will be briefly described with reference to FIG. 1.

The description will be commenced with respect to a standstill condition of an associated motor vehicle wherein the engine is under idling and the transmission takes a neutral position having clutches CA and CB kept released. As will be described hereinafter, these clutches CA and CB are respective major parts of two speed groups.

When now, for starting the motor vehicle, it is intended to select the first speed from the neutral position, a coupling sleeve 2 of a synchronizing coupling mechanism (or gear selection mechanism) 1 for the first speed is shifted leftward (in FIG. 1) by a shift actuator 3 from a neutral position as shown in the drawing to a first speed selection position (viz., first shift gear-in establishing position) keeping the released condition of the two clutches CA and CB. With this shifting, a first speed output gear 4 is brought into engagement with a countershaft 5 thereby to select a first speed transmission gear train. Then, the clutch CA of the speed group that includes the first speed is engaged to practically establish the first speed transmission gear train. That is, the first speed is established in the transmission.

During the time for which the above-mentioned shifting (or pre-shifting) to the first speed is being carried out, a coupling sleeve 7 of a synchronizing coupling mechanism (or gear selection mechanism) 6 for the second speed is shifted leftward (in FIG. 1) by a shift actuator 8 from a neutral position as shown in the drawing to a second speed selection position (viz., second speed shift gear-in establishing position), so that a second speed output gear 9 is brought into engagement with the counter shaft 5 thereby to select a second speed transmission gear train. That is, during the above-mentioned time, a pre-shifting to the second speed is carried out.

When it is intended to make an up-shifting from the first speed to the second speed, the clutch CB for the speed group that includes the second speed is controlled to start its engaging operation, and when the engaging operation of the clutch CB is advanced by a certain degree, the clutch CA for the speed group that includes the first speed is disengaged or released, so that the speed change from the first speed to the second speed is carried out by the switching action between the two clutches CA and CB.

When, after completion of the speed change from the first speed to the second speed, a coupling sleeve 11 of a synchronizing coupling mechanism (or gear selection mechanism) 10 for the third speed is shifted leftward (in FIG. 1) by a shift actuator 12 from a neutral position as shown in the drawing to a third speed selection position (viz., third speed shift gear-in establishing position), a third speed input gear 13 is brought into engagement with a corresponding input shaft 14 thereby to select a third speed transmission gear train. That is, a pre-shifting to the third speed is carried out.

When it is intended to make an up-shifting from the second speed to the third speed, the clutch CB for the speed group that includes the third speed is controlled to start its engaging opening, and when the engaging operation of the clutch CB is advanced by a certain degree, the clutch CA for the speed group that includes the second speed is disengaged or released, so that the speed change from the second speed to the third speed is carried out by the switching action between the two clutches CA and CB. That is, switching of transmission gear trains is carried out from the second speed to the third speed.

When, after completion of the speed change from the second speed to the third speed, coupling sleeve 7 of synchronizing coupling mechanism (or gear selection mechanism) 6 for the fourth speed is shifted back by shift actuator 8 from the second speed selection position (viz., second speed shift gear-in establishing position) to the neutral position as shown in the drawing, and then coupling sleeve 7 is shifted rightward in the drawing from the neutral position to a fourth speed selection position (viz., fourth speed shift gear-in establishing position). With this shifting, a fourth speed output gear 15 is brought into engagement with countershaft 5 thereby to select a fourth speed transmission gear train. That is, a pre-shifting to the fourth speed is carried out.

By making similar switching control for the two clutches CA and CB and similar pre-shifting, up-shifting from the third speed to the fourth speed, up-shifting from the fourth speed to the fifth speed and up-shifting from the fifth speed to the sixth speed are practically carried out.

For making a down-shifting from the sixth speed toward the first speed in due order through the fifth speed, the fourth speed, the third speed and the second speed, similar but reversed switching control for the two clutches CA and CB and similar pre-shifting are carried out. That is, by making similar switching control for the two clutches CA and CB and similar pre-shifting, desired down-shifting is carried out.

When, for a reverse movement of the vehicle, it is intended to select a reverse from the neutral position, coupling sleeve 2 of synchronizing coupling mechanism (or gear selection mechanism) 1 for the reverse is shifted (or pre-shifted) rightward by shift actuator 3 from the neutral position as shown in the drawing to a reverse selection position (or reverse shift gear-in establishing position) keeping the released condition of the two clutches CA and CB. With this pre-shifting, a reverse output gear 16 is brought into engagement with countershaft 5 thereby to select a reverse transmission gear train. Then, clutch CA of the speed group that includes the reverse is engaged to practically establish the reverse transmission gear train. That is, reverse mode of the transmission is established and thus the vehicle runs backward.

As has been mentioned hereinabove, in order to automatically control the manual transmission, it is necessary to detect the shift position of each synchronizing coupling mechanism (or gear selection mechanism).

For such shift position detection, a shift position sensor 17 of magnetically coupled type is used, which comprises a permanent magnet 17a (see FIG. 2) that moves together with coupling sleeve (2) and a magnetic sensor 17b that is fixed to a fixed portion of the transmission to sense a magnetic flux produced by permanent magnet 17a.

For clarity of the drawing of FIG. 1, only the shift position sensor used for "1-R" (first speed-reverse) is denoted by numeral 17.

For carrying out the above-mentioned speed change shifting, operation of shift actuators 3, 8 and 12 (or shifting operation of synchronizing coupling mechanisms 1, 6 and 10) is controlled in the following manner by a control unit 21 through an actuator hydraulic module 22. It is to be noted that, in FIG. 1, a shift actuator 26 is further shown, which is used for establishing the sixth speed transmission gear train.

When, for staring the vehicle, the pre-shifting to the first speed from the neutral position is detected, control unit 21 issues an instruction signal to an actuator hydraulic module 22, for the purpose of shifting coupling sleeve 2 leftward from the neutral position as shown in FIG. 1 to the first speed selection position (or first speed shift gear-in establishing position).

The detection of pre-shifting to the first speed can be made by a movement of a shift lever of the transmission and/or various information signals fed to control unit 21. As is seen from FIG. 1, the information signals fed to control unit 21 are those issued from a vehicle speed sensor, an accelerator pedal depressing degree sensor, a range position sensor and other sensors and switches.

Upon receiving such instruction signal, actuator hydraulic module 22 controls shift actuator 3 so that coupling sleeve 2 is shifted (or pre-shifted) to the first speed selection position (or first speed shift gear-in establishing position).

In response to the hydraulic pressure applied thereto, shift actuator 3 shifts or moves coupling sleeve 2 to the first speed selection position (or first speed shift gear-in establishing position). That is, requested pre-shifting to the first speed is achieved.

During operation for such pre-shifting, the shift position of synchronizing coupling mechanism (or gear selection mechanism) 1 is continuously detected by shift position sensor 17 and output data issued from shift position sensor 17 is processed by control unit 21. When the output data issued from shift position sensor 17 coincides with a value that corresponds to the first speed selection position (viz., first speed shift gear-in establishing position), control unit 21 judges that synchronizing coupling mechanism (or gear selection mechanism) 1 for the first speed has arrived at the first speed selection position (viz., first speed shift gear-in establishing position) and thus judges that the pre-shifting to the first speed has been finished. Upon this, control unit 21 issues an instruction signal to actuator hydraulic module 22 for making the actuating pressure of shift actuator 3 zero.

Thus, a shift force of shift actuator 3 for pressing coupling sleeve 2 to the first speed selection position (or first speed shift gear-in establishing position) becomes zero finishing the pre-shifting control for the first speed.

When, for reverse running, the pre-shifting to the reverse from the neutral position is detected, control unit 21 issues an instruction signal to actuator hydraulic module 22, for the purpose of shifting coupling sleeve 2 rightward from the neutral position as shown in FIG. 1 to the reverse selection position (or reverse shift gear-in establishing position).

Upon receiving such instruction signal, actuator hydraulic module 22 controls shift actuator 3 so that coupling sleeve 2 is shifted (or pre-shifted) to the reverse selection position (or reverse shift gear-in establishing position).

In response to the hydraulic pressure applied thereto, shift actuator 3 shifts or moves coupling sleeve 2 to the reverse selection position (or reverse shift gear-in establishing position). That is, requested pre-shifting to the reverse is achieved.

During operation of such pre-shifting, the shift position of synchronizing coupling mechanism (or gear selection mechanism) 1 is continuously detected by shift position sensor 17 and output data issued from shift position sensor 17 is processed by control unit 21. When the output data issued from shift position sensor 17 coincides with a value that corresponds to the reverse selection position (viz., reverse shift gear-in establishing position), control unit 21 judges that synchronizing coupling mechanism (or gear selection mechanism) 1 for the reverse has arrived at the reverse selection position (viz., reverse shift gear-in establishing position) and thus judges that the pre-shifting to the reverse has finished. Upon this, control unit 21 issues an instruction signal to actuator hydraulic module 22 for making the actuating pressure of shift actuator 3 zero.

Thus, a shift force of shift actuator 3 for pressing coupling sleeve 2 to the reverse selection position (or reverse shift gear-in establishing position) becomes zero finishing the pre-shifting control for the reverse.

In the following, a pre-shifting load that is to be applied to coupling sleeve 2 by shift actuator 3 for carrying out the above-mentioned pre-shifting will be described.

The pre-shifting load produced by shift actuator 3 is used for shifting coupling sleeve 2 to a desired one of the shift gear-in establishing positions.

However, if the pre-shifting load is unnecessarily large, durability of the 1-R synchronizing coupling mechanism is decreased. Furthermore, such unnecessarily larger pre-shifting load tends to produce undesired noise or vibration at the time when the coupling sleeve is shifted to the shift gear-in establishing position. In view of these facts, the pre-shifting load should be controlled or determined to a minimum but practical degree.

In the first embodiment of the invention, the following measure is employed for satisfying the above-mentioned control for the pre-shifting load.

That is, an initial value of the pre-shifting load is set, for example, to 200N, that is, an almost minimum value that makes the pre-shifting possible at ordinary temperature, and with such initial minimum pre-shifting load, shifting of coupling sleeve 2 to a desired shift gear-in establishing position is tried.

If output data issued from shift position sensor 17 does not show a value corresponding to the desired shift gear-in establishing position even when a predetermined time passes after the time when the instruction for the shifting is issued, the following shift re-try control is carried out judging that coupling sleeve 2 has not arrived at the desired shift gear-in establishing position.

In the shift re-try control, coupling sleeve 2 is returned back to the neutral position, and the pre-shifting load is increased by a certain degree (for example, 100N) from the initial value, and then, with such once increased pre-shifting load, the shifting of coupling sleeve 2 to the shift gear-in establishing position is tried again.

If output data issued from shifting position sensor 17 does not show the corresponding value for the shift gear-in establishing position even when the above-mentioned re-try action is carried out, coupling sleeve 2 is returned back to the neutral position again, and the pre-shifting load is increased by a certain degree (for example, 100N) from the once increased value, and then, with such twice increased pre-shifting load, the shifting of coupling sleeve 2 to the desired shift gear-in establishing position is tried again.

The above-mentioned re-try action is repeated until the shifting of coupling sleeve 2 to the desired shift gear-in establishing position is correctly made, that is, until the time when the output data issued from shift position sensor 17 shows a value that corresponds to the desired shift gear-in establishing position.

With the above-mentioned repeated shift re-try action, the pre-shifting load can be controlled to a minimum value that enables coupling sleeve 2 to completely reach the desired shift gear-in establishing position. In this case, the pre-shifting load is not unnecessarily large, and thus, the durability of the 1-R synchronizing coupling mechanism is not decreased and undesired noise or vibration is not produced or at least minimized even when coupling sleeve 2 is shifted to the desired shift gear-in establishing position.

The minimum and practical value of the pre-shifting load becomes high as the temperature of the hydraulic fluid of the transmission lowers.

The reasons are as follows. That is, the viscosity of the hydraulic fluid becomes high as the temperature of the hydraulic fluid lowers, which makes preparation of a desired shifting load difficult. Furthermore, for the same reason, the relative rotation between meshed gears at the time of establishing the shift gear-in establishing position is subjected to a marked rotational resistance, which needs increase in the pre-shifting load. Consequently, the number of the above-mentioned re-try action is increased.

In the following, a shift position detecting device of a first embodiment of the present invention incorporated with 1-R synchronizing coupling mechanism (or gear selection mechanism) 1 will be described in detail with reference to FIGS. 1 and 2.

Figure 2:
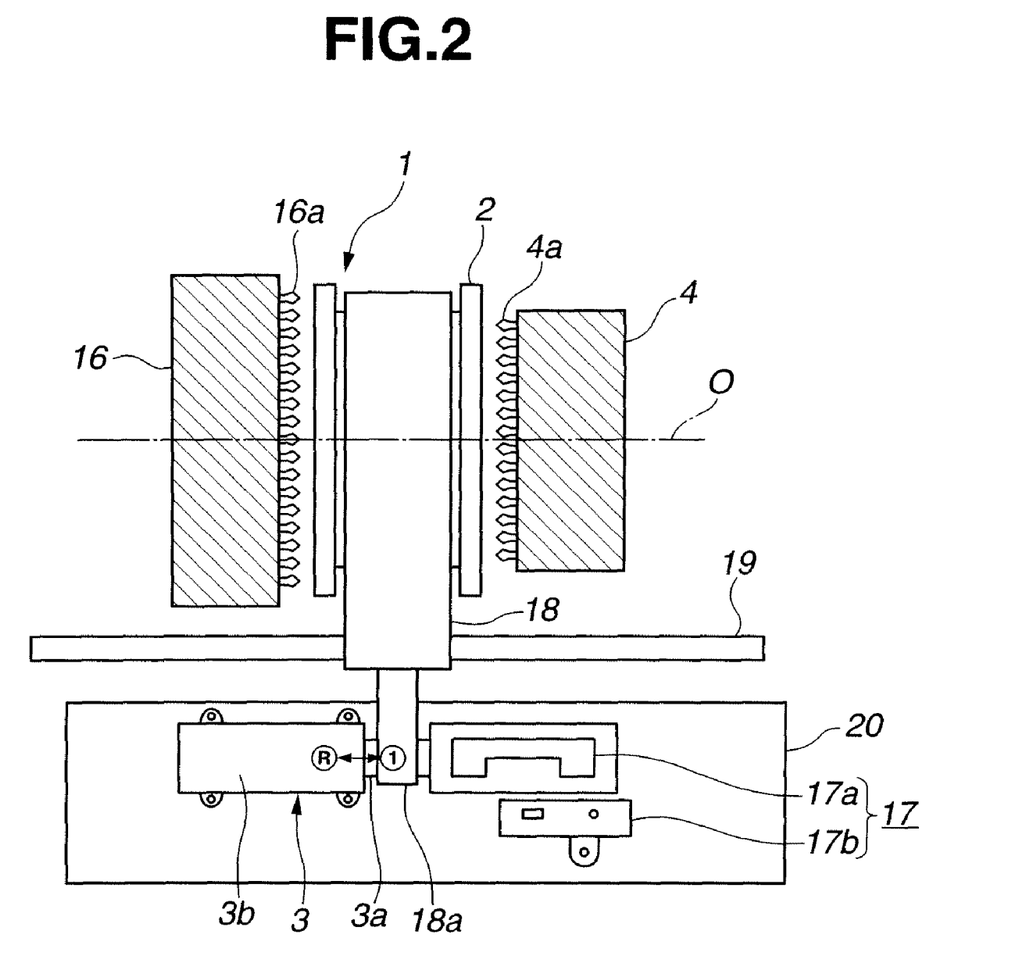
FIG. 2 is a schematic side view of 1-R synchronizing coupling mechanism with a shift position sensor, which is employed in the automatic-manual transmission of FIG. 1.

As is seen from FIGS. 1 and 2, 1-R synchronizing coupling mechanism (or gear selection mechanism) 1 is arranged to surround countershaft 5 that rotates about an axis "O" (see FIG. 2) thereof. As is best seen from FIG. 2, the synchronizing coupling mechanism 1 includes a coupling sleeve 2 that is able to move axially in both rightward and leftward directions in the drawing.

As shown in the drawings, coupling sleeve 2 is arranged between first speed output gear 4 and reverse output gear 16 that are rotatably disposed about countershaft 5. It is to be noted that for ease of understanding, the positional relation of the two gears 4 and 16 shown in FIG. 2 is reversed relative to that shown in FIG. 1.

As shown in FIG. 2, first speed output gear 4 is formed with clutch gear teeth 4*a*, and reverse output gear 16 is formed with clutch gear teeth 16*a*.

As is seen from FIG. 2, when coupling sleeve 2 is shifted rightward from a neutral position as shown in the drawing and meshed with clutch gear teeth 4*a* of first speed output gear 4, 1-R synchronizing coupling mechanism (or gear section mechanism) 1 functions to engage first speed output gear 4 with countershaft 5 thereby to select a first speed transmission gear train. Similarly, when coupling sleeve 2 is shifted leftward from the neutral position and meshed with clutch gear teeth 16*a* of reverse output gear 16, 1-R synchronizing coupling mechanism (or gear selection mechanism) 1 functions to engage reverse output gear 16 with countershaft 5 thereby to select a reverse transmission gear train.

As is seen from FIG. 2, the axial movement of coupling sleeve 2 along the axis "O" is made by an axially movable shift fork 18 that engages with annular grooves formed on coupling sleeve 2. In FIG. 1, shift fork 18 is shown to separate from coupling sleeve 2 for convenience sake.

That is, shift fork 18 is slidably moved on and along a shift rod 19 by shift actuator 3. Shift rod 19 is installed in a transmission case to extend along the direction in which shift fork 18 moves. Shift actuator 3 has an actuating rod 3*a* connected to a shifter 18*a* that radially outward projects from shift fork 18.

Shift actuator 3 is of a hydraulic reciprocating type including mutually engaged piston and cylinder. As shown in FIG. 2, shift actuator 3 is mounted to a mounting plate 20 fixed to the transmission case. For this mounting, an actuator body 3*b* of shift actuator 3 that includes the piston and cylinder is fixed to mounting plate 20.

As shown in FIG. 2, upon actuation of shift actuator 3, actuating rod 3*a* makes a straight movement in one of the directions indicated by arrows. Upon this, coupling sleeve 2 is moved toward a given position through shifter 18*a* and shift fork 18. That is, when coupling sleeve 2 is moved rightward, the above-mentioned first speed transmission gear train is selected, while when coupling sleeve 2 is moved leftward, the above-mentioned reverse transmission gear train is selected. That is, upon operation of shift actuator 3, coupling sleeve 2 is shifted to the first speed shift gear-in establishing position or the reverse shift gear-in establishing position.

In order to detect the position taken by coupling sleeve 2 that is absolutely needed for carrying out the pre-shifting for the first speed or the pre-shifting for the reverse, the shift position sensor 17 is employed, which has the following construction.

That is, as is seen from FIG. 2, shift position sensor 17 comprises a permanent magnet 17*a* that is mounted to shifter 18*a* to move therewith and a magnetic sensor 17*b* that is secured to a given portion of mounting plate 20 for sensing a magnetic flux produced by permanent magnet 17*a*. That is, by sensing a change of the magnetic flux produced by magnet 17*a*, the sensor 17*b* detects a displacement of permanent magnet 17*a* relative to the sensor 17*b* with the aid of a known control unit. Actually, by the control unit, the magnetic signal sensed by the magnetometric sensor 17*b* is conversed to a potential signal.

Magnetic sensor 17*b* minutely detects the displacement of permanent magnet 17*a* (or position of coupling sleeve 2), and outputs a potential value that varies continuously in accordance with the detected displacement of permanent magnet 17*a*.

The shift position of coupling sleeve 2 and the output data issued from the sensor 17*b* are proportional to each other. Accordingly, by processing the output data of the sensor 17*b*, the shift position of coupling sleeve 2 can be derived.

However, as is known, if the shift position sensor 17 is not accurately assembled or correctly mounted on the given position of mounting plate 20, the sensor 17 fails to exhibit a satisfied performance.

For solving such drawback, the following process is carried out by control unit 21 in the first embodiment of the invention.

That is, first, coupling sleeve 2 is shifted to the rightmost position in FIG. 2 by shift actuator 3, that is, the position (or first speed shift gear-in establishing position) where coupling sleeve 2 fully or deeply abuts against clutch gear teeth 4*a* of first speed output gear 4, and output data issued from shift position sensor 17 when coupling sleeve 2 comes to the rightmost position is treated as a decided data that represents completion of shifting of coupling sleeve 2 to the first speed shift gear-in establishing position.

Like the above, coupling sleeve 2 is shifted to the leftmost position in FIG. 2 by shift actuator, that is, the position (or reverse shift gear-in establishing position) where coupling sleeve 2 fully or deeply abuts against clutch gear teeth 16*a* of reverse output gear 16, and the output data issued from shift position sensor 17 when coupling sleeve 2 comes to the leftmost position is treated as an information data that represents completion of shifting of coupling sleeve 2 to the reverse shift gear-in establishing position.

By using the output data from shift position sensor 17, control unit 21 carries out a calibration for making a data map that indicates a relation between the output data and the shift positions. With reference to the data map, the shift position is looked up from a certain output data.

Figure 3:
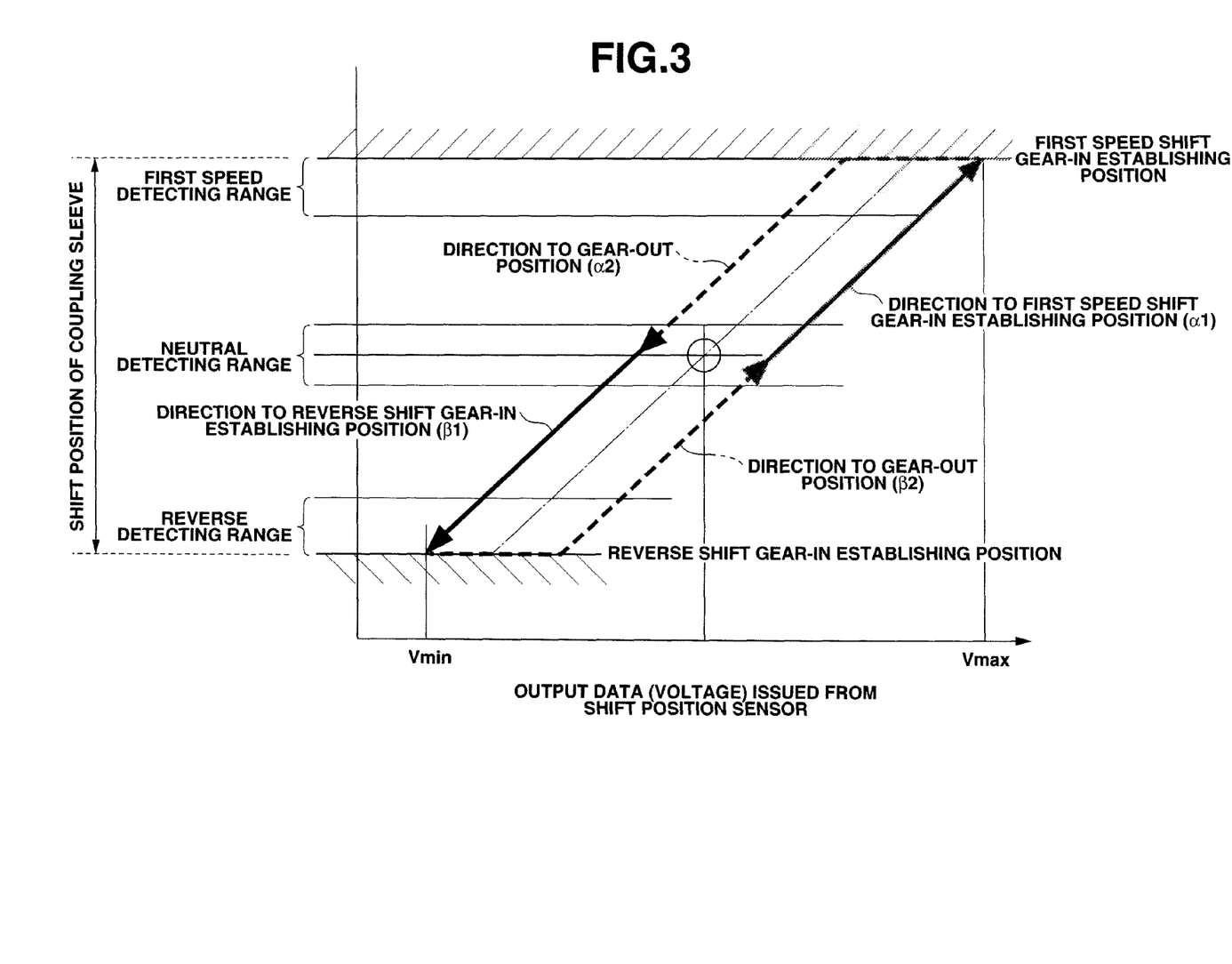
FIG. 3 is a graph showing a relation between an output data issued from the shift position sensor of FIG. 2 and a shift position taken by a coupling sleeve.

The above-description will be clearly understood from the following explanation that is directed to FIG. 3.

FIG. 3 is a data map showing the relation between the output data issued from shift position sensor 17 and the shift position taken by coupling sleeve 2. That is, the vertical axis represents the shift position of coupling sleeve 2 and the horizontal axis represents the output data issued from shift position sensor 17.

As is seen from the data map, during the time for which coupling sleeve 2 is being shifted from the neutral position to the first speed shift gear-in establishing position, the output data issued from shift position sensor 17 increases linearly to the maximum value "Vmax" as is indicated by an arrow "α1".

While, during the time for which coupling sleeve 2 is being shifted back from the first speed shift gear-in establishing position to the neutral position for effecting the first speed shift gear-out operation, the output data issued from shift position sensor 17 decreases linearly with a certain hysteresis as is indicated by an arrow "α2". For ease of understanding, the hysteresis is shown with exaggeration.

During the time for which coupling sleeve 2 is being shifted from the neutral position to the reverse shift gear-in establishing position, the output data issued from shift position sensor 17 decreases linearly to the minimum value "Vmin" as is indicated by an arrow "β1".

While, during the time for which coupling sleeve 2 is being shifted back from the reverse shift gear-in establishing position to the neutral position for effecting the reverse shift gear-out operation, the output data issued from shift position sensor 17 increases linearly with a certain hysteresis as is indicated by an arrow "β2". For ease of understanding, the hysteresis is shown with exaggeration.

As is seen from the data map of FIG. 3, irrespective of presence of the hysteresis, the shift position of coupling sleeve 2 is readily found from the output data issued from shift position sensor 17. Accordingly, the correlation between each shift gear-in establishing position and the corresponding output data issued from shift position sensor 17 should be precisely treated.

When coupling sleeve 2 is shifted to one shift gear-in establishing position (viz., first speed shift gear-in establishing position or reverse shift gear-in establishing position) by shift actuator 3, a magnet supporting structure (18, 18a) that extends between coupling sleeve 2 and the permanent magnet 17a is subjected to warping. Accordingly, even when coupling sleeve 2 comes to the shift gear-in establishing position where coupling sleeve 2 can make no further movement, the output data issued from shift position sensor 17 is forced to have a value that differs from a desired correct value by a degree corresponding to the degree of the warping of the magnet supporting structure (18, 18a).

That is, even when coupling sleeve 2 completes its shifting to for example the first speed shift gear-in establishing position due to the work of shift actuator 3, the output data issued from shift position sensor 17 is enforced to have a value that is larger than the maximum value "Vmax" by a degree that corresponds to the warping of the magnet supporting structure (18, 18a).

Furthermore, even when coupling sleeve 2 completes its shifting to for example the reverse shift gear-in establishing position due to the work of shift actuator 3, the output data issued from shift position sensor 17 is enforced to have a value that is smaller than the minimum value "Vmin" by a degree that corresponds to the warping of the magnet supporting structure (18, 18a).

Furthermore, as is known, the degree of warping of the magnet supporting structure (18, 18a) varies depending on the individual difference of each transmission.

These undesired facts deteriorate the above-mentioned correlation between the shift gear-in establishing position of coupling sleeve 2 and the output data issued from shift position sensor 17. That is, with such warping, accurate detection of the shift position of coupling sleeve 2 from the data map is not expected.

In the first embodiment of the present invention, by using the following measure, the warping of the magnet supporting structure (18, 18a), which is inevitably induced when coupling sleeve 2 is shifted to the shift gear-in establishing position, has no effect on finding correct information data that represents completion of shifting of coupling sleeve 2 to the shift gear-in establishing position.

That is, in the first embodiment, the correlation between each shift gear-in establishing portion of coupling sleeve 2 and the corresponding output data issued from shift position sensor 17 is treated much practical with the aid of control unit 21.

Figure 4:
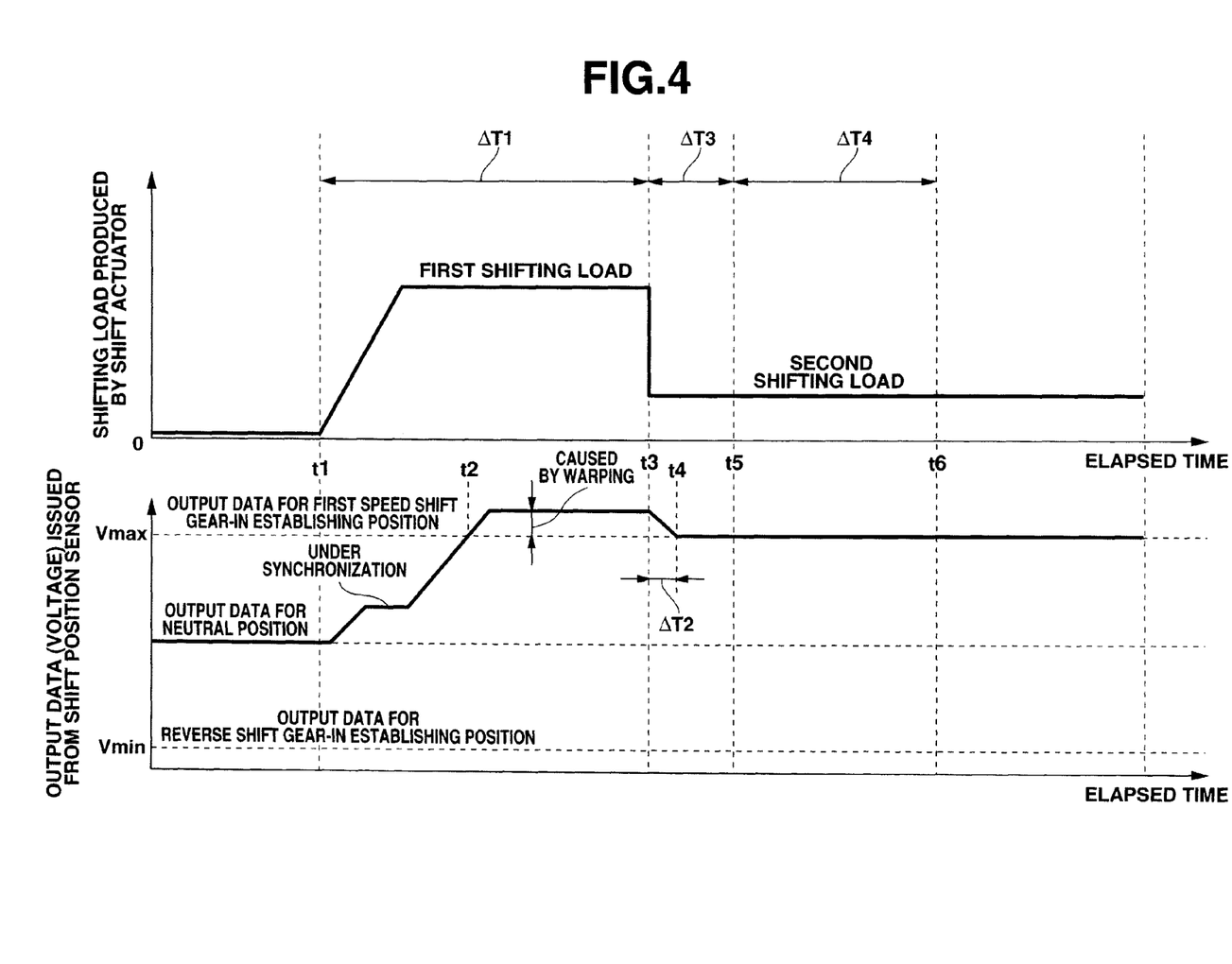
FIG. 4 is a time chart showing a control of a first embodiment of the present invention for correlating a shift gear-in establishing position with an output data issued from the shift position sensor, which is executed by a control unit for the automatic-manual transmission of FIG. 1.

That is, as is shown in the graph of FIG. 4 that is a time chart showing a control for correlating the shift gear-in establishing position with an output data issued from shift position sensor, during the time from "t1" to "t3" for which the first speed shift gear-in establishing time "ΔT1" is passing, the shifting load produced by shift actuator 3 is increased to a first shifting load (viz., shift gear-in load) and then the shifting load is kept at the first shifting load.

The first shifting load has a value (or load) that assures the shifting of coupling sleeve 2 to the shift gear-in establishing position even if the transmission is in frigid temperatures. For example, the value is about 1000N.

The first speed shift gear-in establishing time "ΔT1" is a time needed for assuredly shifting coupling sleeve 2 from the neutral position to the first shift gear-in establishing position, and the first shifting load (viz., shift gear-in load) is a sufficiently large load needed for assuredly shifting coupling sleeve 2 from the neutral position to the first shift gear-in establishing position.

Accordingly, due to the work of shift actuator 3, coupling sleeve 2 is shifted from the neutral position to the first shift gear-in establishing position, and thus, the output data (viz., potential value) of shift position sensor 17 varies or increases in such a manner as is shown in the time chart of FIG. 4.

As shown in the time chart of FIG. 4, from the time "t2" when coupling sleeve 2 just comes to the first shift gear-in establishing position, further shifting movement of coupling sleeve 2 is suppressed, and thus, coupling sleeve 2 is kept at the first shift gear-in establishing position.

However, as is seen from the time chart, due to the warping of the magnet supporting structure (18, 18a), the output data of shift position sensor 17 is forced to increase even after the time "t2" by a degree corresponding to the warping.

At the time "t3" when the first speed shift gear-in establishing time "ΔT1" just passes, the shifting load produced by shift actuator 3 is sharply lowered from the first shifting load to a second shifting load and then the shifting load is kept at the second shifting load.

The second shifting load is set to a predetermined low value that does not induce the warping of the magnet supporting structure (18, 18a). In other words, the second shifting load has a value that induces a smaller warping of the shift transfer portion (18, 18a) that does not affect the output data issued from shift position sensor 17.

Accordingly, at the time "t3", shift actuator 3 lowers the actuating force applied to shift fork 18 and thus the warping of the magnet supporting structure (18, 18a) becomes zero. Thus, after a certain time lag "ΔT2" from the time "t3", the output data of shift position sensor 17 lowers and at the time "T4" when the time lag "ΔT2" is completed, the output data from the sensor 17 shows a value that corresponds to the first speed shift gear-in establishing position.

In the above description, the second shifting load is set to the low load that does not induce the warping of the magnet supporting structure (18, 18a). However, if desired, such second shifting load may be set to a vary small load that induces only a very small warping of the magnet supporting structure (18, 18a).

In the above description, at the time "t3", the shifting load produced by shift actuator 3 is controlled to be sharply lowered from the first shifting load to the second shifting load. However, if desired, such lowering of the shifting load to the second shifting load may be slowly carried out. In this case, the shifting load established when the output data from shift position sensor 17 does not lower any longer may be used as the second shifting load.

From the time "t5" when a time "ΔT3" has passed from the time "t3", the output data from shift position sensor 17 starts to be read and the data reading is kept from the time "t5" to the time "t6" when a predetermined time "ΔT4" has passed from the time "t5".

The output data kept issued from shift position sensor 17 during the time from the time "t5" to the time "t6" are averaged to obtain a mean value and the mean value thus obtained is memorized or stored as an information data that represents completion of shifting of coupling sleeve 2 to the first speed shift gear-in establishing position. The mean value is used for making the above-mentioned data map.

As will be understood from the above description, control unit 21 (see FIG. 1) comprises generally a first shifting load instruction section, a second shifting load instruction section and a shift gear-in establishing position memory section.

In the first embodiment of the invention, the output data issued from shift position sensor 17 when coupling sleeve 2 is shifted to the shift gear-in establishing position by shift actuator 3 is not directly used as the information data.

That is, in the first embodiment, the following unique steps are taken.

Once coupling sleeve 2 is shifted to the shift gear-in establishing position, the shifting load applied to coupling sleeve 2 from shift actuator 3 is lowered from the first shifting load (viz., the shift gear-in load needed for shifting coupling sleeve 2 to the shift gear-in establishing position) to the second shifting load that is lower than the first shifting load, and the output data issued from shift position sensor 17 when the shifting load is lowered to the second shift load is memorized or stored as an information data that represents completion of shifting of coupling sleeve 2 to the shift gear-in establishing position.

Accordingly, the influence of the warping that would appear at the magnet supporting structure (18, 18a) when coupling sleeve 2 is shifted to the shift gear-in establishing position can be avoided or at least minimized, so that the correlation between the shift gear-in establishing position for coupling sleeve 2 and the output data issued from shift position sensor 17 is much more practically used.

Thus, when a data map is produced by practically using the correlation between the shift position and the shift position sensor output data, the data map can avoid influence caused by the above-mentioned warping of the magnet supporting structure (18, 18a). That is, the data map thus made can be much practically used.

If the second shifting load is set to a value that induces zero (0) of the warping of the magnet supporting structure (18, 18a), the influence by the warping of the magnet supporting structure (18, 18a) is completely avoided. Thus, the correlation between the shift gear-in establishing portion for coupling sleeve 2 and the output data issued from shift position sensor 17 is much more practically provided.

As is seen from the time chart of FIG. 4, the output data issued from shift position sensor 17 from the time "t5" when the time "ΔT3" passes from the time "t3" is memorized or stored as an information data that represents completion of shifting of coupling sleeve 2 to the shift gear-in establishing position. Accordingly, errors that would appear in the output data of shift position sensor 17 during the time "ΔT2" for which the warping of the shift transfer portion (18, 18a) is kept remained can be assuredly avoided.

During the time "ΔT4" for which the shifting load produced by shift actuator 3 is kept to the second shifting load, the output data issued from shift position sensor 17 are read and averaged to obtain a mean value, and the mean value is memorized or stored as an information data that represents completion of coupling sleeve 2 to the shift gear-in establishing position. Accordingly, even when some of the output data of shift position sensor 17 are subjected to electric fluctuation, such fluctuation is appropriately absorbed. Thus, the correlation between the shift gear-in establishing position of coupling sleeve 2 and the output data issued from shift position sensor 17 is much more practically provided.

In the above-mentioned embodiment, as is seen from the graph of FIG. 3, due to the hysteresis appearing in the relation between the output data of shift position sensor 17 and the shift position of coupling sleeve 2, a certain error is inevitably produced in the data map.

In the second embodiment of the present invention, such error can be avoided or at least minimized.

The second embodiment will be described with reference to a time chart of FIG. 5.

Figure 5:
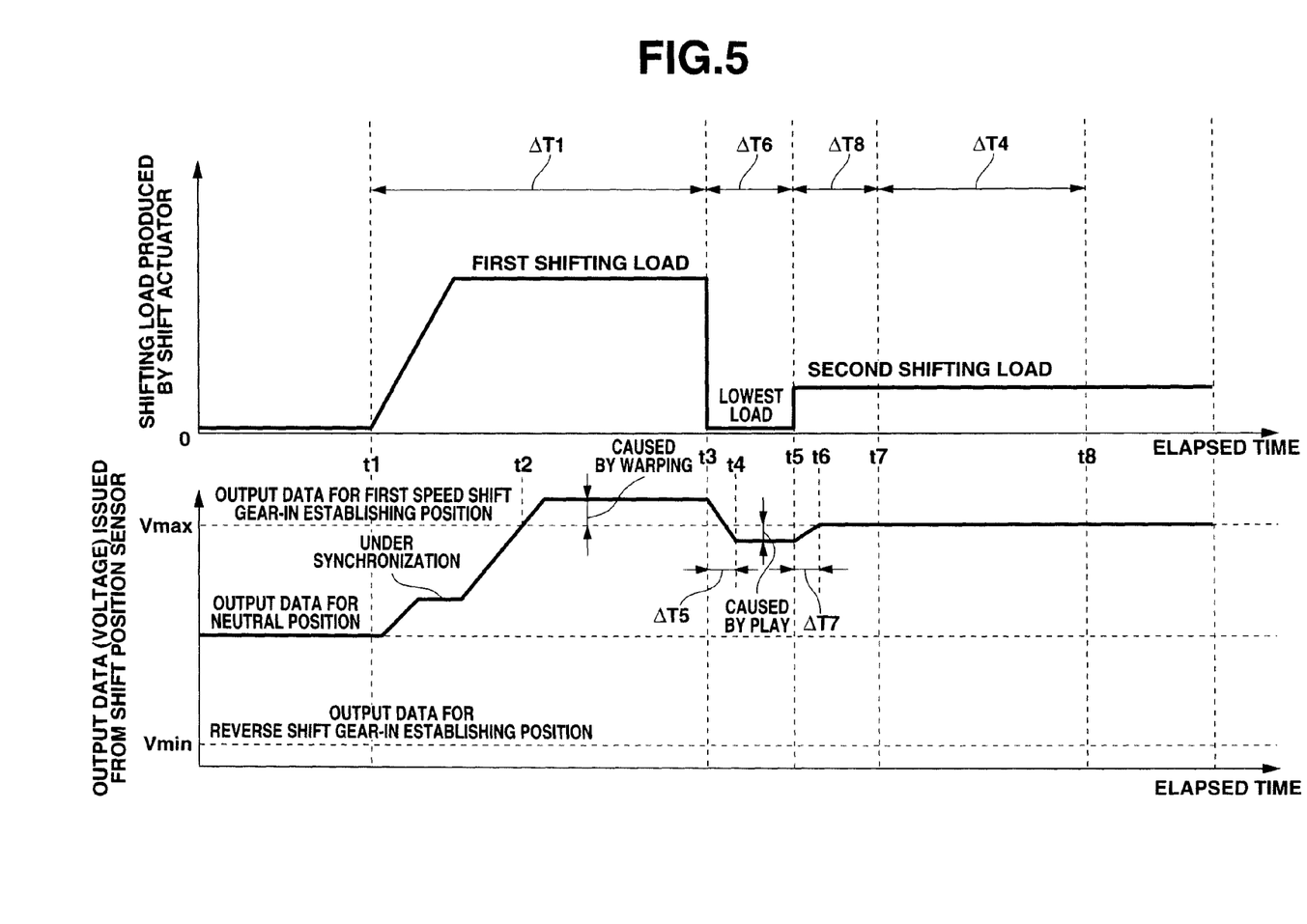
FIG. 5 is a time chart similar to that of FIG. 4, but showing a control of a second embodiment of the present invention.

That is, in the second embodiment, as is shown in the time chart of FIG. 5, during the time from "t1" to "t3" for which the first speed shift gear-in establishing time "ΔT1" is passing, the shifting load produced by shift actuator 3 is increased to the first shift load (viz., shift gear-in load) and then the shifting load is kept at the first shifting load.

Accordingly, due to the work of shift actuator 3, coupling sleeve 2 is moved or shifted from the neutral position to the first shift gear-in establishing position, and thus, the output data (viz., potential value) of shift position sensor 17 varies or increases in such a manner as is shown in the time chart of FIG. 5.

As shown in the time chart of FIG. 5, from the time "t2" when coupling sleeve 2 just comes to the first shift gear-in establishing position, further displacement of coupling sleeve 2 is impossible and thus coupling sleeve 2 is kept at the first shift gear-in establishing position.

However, as is seen from the time chart, due to the warping of the magnet supporting structure (18, 18a), the output data of shift position sensor 17 is forced to increase even after the time "t2" by a degree corresponding to the warping.

At the time "t3" when the first speed shift gear-in establishing time "ΔT1" just passes, the shifting load produced by shift actuator 3 is sharply lowered from the first shifting load to a lowest load (for example, 0 (zero) in the illustrated example) that is lower than the above-mentioned second shifting load, and then the shifting load is kept at the lowest load.

Due to the sudden lowering of the shifting load to the lowest load by shift actuator 3, the actuating force applied to shift fork 18 becomes substantially 0 (zero), and thus, the warping of the magnet supporting structure (18, 18a) disappears.

Furthermore, due to the sudden lowering of the shifting load, coupling sleeve 2 is returned back toward the neutral position by a degree corresponding to an inevitable play, and thus, after a certain time lag "ΔT5" from the time "t3", the output data of shift position sensor 17 lowers and at the time "t4" when the time lag "ΔT5" is completed, the output data of shift position sensor 17 shows a value that is provided by subtracting a value corresponding the above-mentioned play from a value corresponding to the first speed shift gear-in establishing position.

At the time "t5" when a time "ΔT6" passes from the time "t3", the shifting load produced by shift actuator 3 is sharply increased from the lowest load (0 (zero) load) to the above-mentioned second shifting load that does not induce the warping of the shift transfer potion (18, 18a), and thereafter the shifting load is kept at the second shifting load.

Due to the increase of the shifting load produced by shift actuator 3, the actuating force applied to shift fork 18 is increased, and thus coupling sleeve 2 is shifted toward the first speed shift gear-in establishing position by a degree corresponding to the play.

Since the increase of the shifting load is toward the second shifting load that does not induce the warping of the magnetic supporting structure (18, 18a), coupling sleeve 2 can be shifted to the first speed shift gear-in establishing position without inducing the warping of the magnet supporting structure (18, 18a).

Accordingly, from the time "t5", the output data of shift position sensor 17 increases with a certain time lag "ΔT7" in a manner as is shown in the time chart of FIG. 5, and at the time "t6" when the time lag "ΔT7" is completed, the output data of shift position sensor 17 indicates a value that corresponds to the first speed shift gear-in establishing position.

From the time "t7" when a time "ΔT8" passes from the time "t5", the output data of shift position sensor 17 starts to be read and the data reading is kept from the time "t7" to the time "t8" when the predetermined time "ΔT4" passes from the time "t7".

The output data kept issued from shift position sensor 17 during the time "ΔT4" are averaged to obtain a mean value and the mean value thus obtained is memorized or stored as an information data that represents completion of shifting of coupling sleeve 2 to the first speed shift gear-in establishing position. The mean value is used for making the above-mentioned data map.

In the second embodiment, the output data that is issued from shift position sensor 17 when coupling sleeve 2 is shifted to the shift gear-in establishing position by shift actuator 3 is not directly used as the information data.

That is, in the second embodiment, the output data that is issued from shift position sensor 17 when the shifting load is lowered to the second shift load that does not induce the warping of the magnet supporting structure (18, 18a) is memorized or stored as an information data that represents completion of shifting of coupling sleeve 2 to the shift gear-in establishing position.

Accordingly, in the second embodiment, the influence of the warping that would appear when coupling sleeve 2 is shifted to the shift gear-in establishing position can be avoided or at least minimized, and thus the correlation between the shift gear-in establishing position for coupling sleeve 2 and the output data issued from shift position sensor 17 is much more practically provided.

Accordingly, a data map that is produced by practically using the shift position sensor output data with reference to the shift position of coupling sleeve 2 can avoid influence from the above-mentioned warping of the magnet supporting structure (18, 18a). That is, the data map thus made can be much practically used.

In the second embodiment, after coupling sleeve 2 is shifted to the shift gear-in establishing position, shift actuator 3 is controlled to produce the lowest load (viz., zero load), which is lower than the second shifting load, before being controlled to produce the second shifting load.

Accordingly, in the second embodiment, errors which would be induced by the hysteresis appearing in the first embodiment can be avoided or at least minimized. Thus, the correlation between the shift gear-in establishing position for coupling sleeve 2 and the output data issued from shift position sensor 17 is much more practically provided.

In the second embodiment, at the time "t5", shift actuator 3 is controlled to produce the second shifting load from a condition wherein shift actuator 3 is controlled to produce the zero loading. The output data of shift position sensor 17 issued after the time "t7" when the time "ΔT8" has passed from the time "t5" are used as data that corresponds to the shift gear-in establishing position for coupling sleeve 2. Accordingly, an error that would be produced during the time "ΔT7" does not affect the output data of shift position sensor 17. Thus, the correlation between the shift gear-in establishing position for coupling sleeve 2 and the output data issued from shift position sensor 17 when coupling sleeve 2 takes the shift gear-in establishing position is much ore practically provided.

In case of the 1-R synchronizing coupling mechanism 1 of FIG. 2, the following measures may be employed, which is a third embodiment of the present invention.

Figure 6:
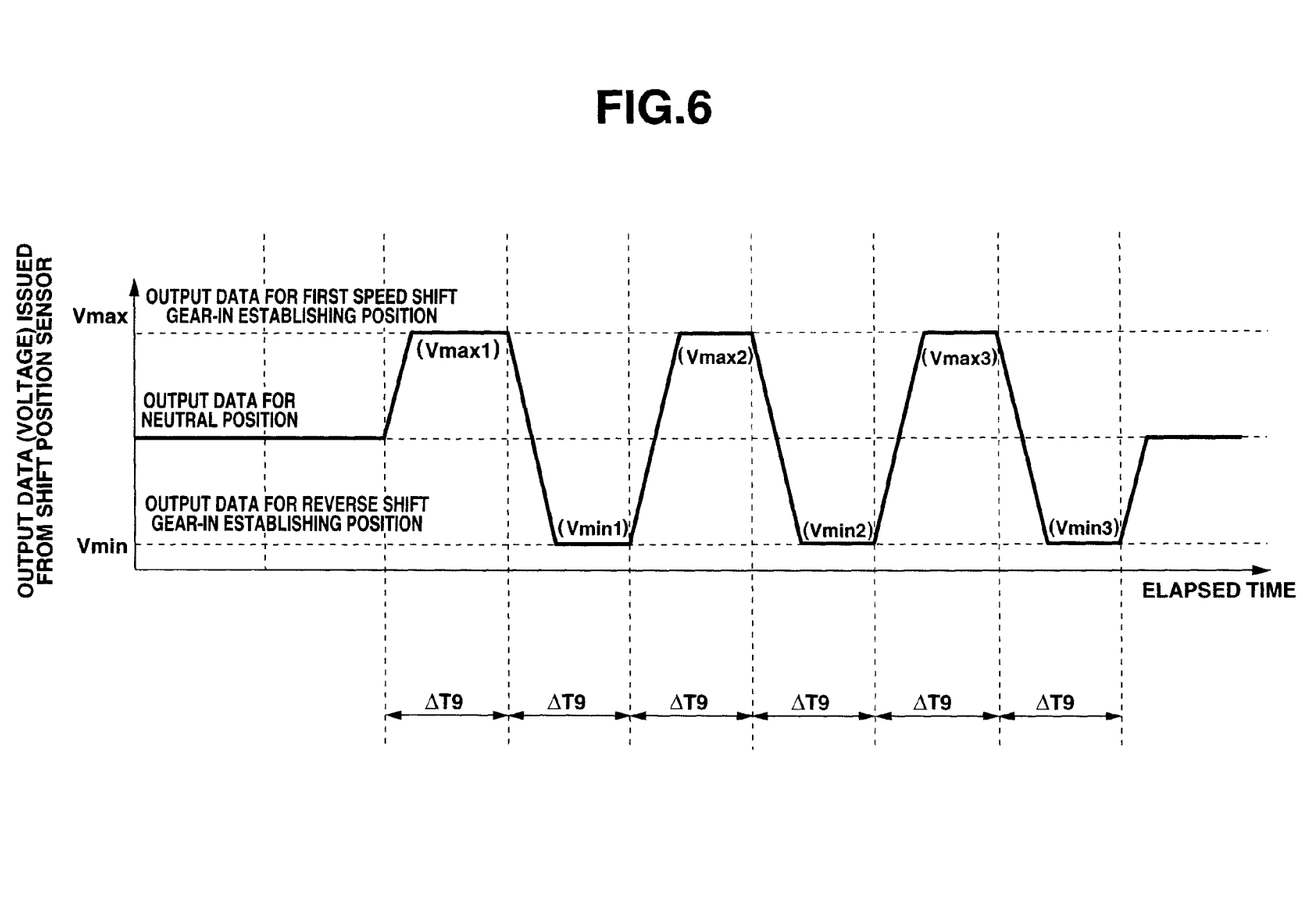
FIG. 6 is a time chart similar to that of FIG. 4, but showing a control of a third embodiment of the present invention.

That is, the following measures are used for achieving the correlation between the first speed shift gear-in establishing position of coupling sleeve 2 and the output data issued from shift position sensor 17 when coupling sleeve 2 takes the first speed shift gear-in establishing position, and achieving the correlation between the reverse shift gear-in establishing position of coupling sleeve 2 and the output data issued from shift position sensor 17 when coupling sleeve 2 takes the reverse shift gear-in establishing position. For achieving these correlations, control unit 21 (see FIG. 1) makes such a control as is depicted by the graph of FIG. 6.

That is, due to operation of shift actuator 3, a first speed shifting operation for shifting coupling sleeve 2 to the first speed shift gear-in establishing position and a reverse shifting operation for shifting coupling sleeve 2 to the reverse shift gear-in establishing position are repeatedly and alternately carried out at a predetermined period "ΔT9".

Each time the shifting is carried out, the mean value of the output data issued from shift position sensor 17 during the time "ΔT4", that is, the mean values "Vmax1", "Vmax2", "Vmax3", . . . of the output data issued when coupling sleeve 2 takes the first speed shift gear-in establishing position and the mean values "Vmin1" "Vmin2" "Vmin3", . . . of the output data issued when coupling sleeve 2 takes the reverse shift gear-in establishing position are obtained.

Among the means values "Vmax1", "Vmax2", "Vmax3", . . . the maximum one is memorized or stored as an information data that represents completion of shifting of coupling sleeve 2 to the first speed shift gear-in establishing position, and among the mean values "Vmin1", "Vmin2", "Vmin3" . . . the minimum one is memorized or stored as an information data that represents completion of shifting of coupling sleeve 2 to the reverse shift gear-in establishing position.

With these measures, the correlation between the shift gear-in establishing position for coupling sleeve 2 and the output data issued from shift position sensor 17 is correctly provided, and the following advantages are expected.

The above-mentioned correlation is carried out when the transmission is in a non-drive range wherein both clutches "CA" and "CB" are released. Thus, it may occur that when making a first shifting operation, coupling sleeve 2 is brought into collision with tops of the clutch gear teeth 4a and 16a causing a failure of coupling sleeve 2 in arriving at the first speed shift gear-in establishing position or revere shift gear-in establishing position.

However, since the first speed shifting operation for shifting coupling sleeve 2 to the first speed shift gear-in establishing position and the reverse shifting operation for shifting coupling sleeve 2 to the reverse shift gear-in establishing position are repeatedly and alternately carried out, the arrival of coupling sleeve 2 at the first speed shift gear-in establishing position or the reverse shift gear-in establishing position can be made by a next shifting operation. That is, even when coupling sleeve 2 fails to arrive at the first speed shift gear-in establishing position or reverse shift gear-in establishing position by the first shifting operation due to the collision of coupling sleeve 2 with tops of the clutch gear teeth 4a and 16a, the next shifting operation induces the arrival of coupling sleeve 2 at the gear-in establishing position.

In the above-mentioned embodiments, the correlation between the shift gear-in establishing position of coupling sleeve 2 and the output data issued from shift position sensor 17 may be updated at the following frequency.

If the associated motor vehicle is just shipped, it is preferable to update the shift gear-in establishing position at predetermined intervals of ignition-on switching operation of an associated automotive engine. The predetermined intervals are varied depending on operation time, travel distance, and number of ignition-on switching operation. With this measure, the correlation between the shift gear-in establishing position and the output data issued from shift position sensor 17 is automatically updated.

As is mentioned hereinabove, the correlation is carried out when the transmission is in the non-drive range wherein both clutches "CA" and "CB" are released. Accordingly, it is necessary to let the driver know that the correlation is being treated.

The reason is as follows. That is, if, under treatment of the correlation, the driver makes a select operation from the non-drive range to a drive range, the clutch "CA" becomes engaged and thus the vehicle is forced to move without driver's intention.

For solving the above-mentioned problem, an indicating means 23 is provided as is shown in FIG. 1.

That is, during the time for which the correlation is being treated, the instruction for the first shifting load is being issued or the instruction for the second shifting load is being issued, the control unit 21 operates the indicating means 23 letting the driver know that the correlation is being treated.

In order to assuredly suppress the above-mentioned problem even if the driver erroneously makes a select operation from the non-drive range to the drive range, a select inhibiting means 24 is provided as is shown in FIG. 1.

That is, during the time for which correlation is being treated, the instruction for the first shifting load is being issued, and the instruction for the second shifting load is being issued, the control unit 21 operates the select inhibiting means 24. With such select inhibiting means 24, actual manual switching from the non-drive range to the drive range is not carried out even if the driver makes a select operation from the non-drive range to the drive range.

Updating of the correlation between the shift gear-in establishing position of coupling sleeve 2 and the output data issued from shift position sensor 17 when coupling sleeve 2 comes to the shift gear-in establishing position is carried out for each speed. Furthermore, such updating of the correlation may be made at the time when the associated motor vehicle at a routine check.

This application is based on prior Japanese Patent Applications No. 2008-184356 filed Jul. 16, 2008 and No. 2007-314397 filed Dec. 5, 2007. The entire contents of Japanese Patent Applications No. 2008-184356 filed Jul. 16, 2008 and No. 2007-314397 filed Dec. 5, 2007 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:

1. A shift position detecting device for an automotive transmission having a plurality of gear trains and a gear selection mechanism for each gear train, the gear selection mechanism being shiftable to a shift gear-in establishing position of one of the plurality of gear trains by a corresponding shift actuator thereby to thereby select a corresponding gear train as a power transmission gear train, the shift position detecting device comprising:
a shift position sensor configured to produce output data that represents a shift position of the gear selection mechanism; and
a control unit including:
a first shifting load instruction section configured to issue an instruction to control the shift actuator to shift the gear selection mechanism to the shift gear-in establishing position using a first shifting load;
a second shifting load instruction section configured to, after completion of shifting of the gear selection mechanism to the shift gear-in establishing position by the first shifting load instruction section, issue an instruction to control the shift actuator to reduce the shifting load from the first shifting load to a second shifting load which is lower than the first shifting load; and
a shift gear-in establishing position memory section configured to store output data issued from the shift position sensor when the shift actuator is controlled by the second shifting load instruction section, as data that represents completion of shifting of the gear selection mechanism to the shift gear-in establishing position.

2. The shift position detecting device as claimed in claim 1, wherein the second shifting load produced by the shift actuator in response to the instruction from the second shifting load instruction section is a load that has substantially no effect on the output data issued from the shift position sensor.

3. The shift position detecting device as claimed in claim 1, wherein the shift gear-in establishing position memory section is configured to update the output data of the shift position sensor at predetermined intervals of an ignition-on switching operation of an associated automotive engine.

4. The shift position detecting device as claimed in claim 3, further comprising an indicator configured to issue an alarm during a time when the shift gear-in establishing position memory section is under operation for storing the shift gear-in establishing position, the instruction for producing the first shifting load is being issued or the instruction for producing the second shifting load is being issued.

5. The shift position detecting device as claimed in claim 3, wherein:
the automotive transmission includes a non-drive range in which a power transmission is blocked and a drive range in which the power transmission is permitted, and
wherein the control unit is configured such that the shifting of the gear selection mechanism to the shift gear-in establishing position, the lowering of the shifting load, and the storing of the shift gear-in establishing position, are carried out when the automotive transmission is in the non-drive range.

6. The shift position detecting device as claimed in claim 5, further comprising a select inhibitor configured to inhibit a manual switching from the non-drive range to the drive range during the time for which the shift gear-in establishing position memory section is storing the shift gear-in establishing position, the instruction for producing the first shifting load is being issued or the instruction for producing the second shifting load is being issued.

7. The shift position detecting device as claimed in claim 1, wherein the shift gear-in establishing position memory section is configured to store, as the data that represents completion of shifting of the gear selection mechanism to the shift gear-in establishing position, an output data issued from the shift position sensor at a time when a predetermined time passes from a time when the second shifting load instruction section controls the shift actuator to reduce the shifting load from the first shifting load to the second shifting load.

8. The shift position detecting device as claimed in claim 7, wherein the predetermined time is a time determined based on a delay in a response of the shift actuator.

9. The shift position detecting device as claimed in claim 1, wherein the second shifting load instruction section is configured to issue an instruction to control the shift actuator to reduce the shifting load from the first shifting load to a lowest load before producing the second shifting load, the lowest load being lower than the second shifting load.

10. The shift position detecting device as claimed in claim 9, wherein the shift gear-in establishing position memory section is configured to store, as the data that represents completion of shifting of the gear selection mechanism to the shift gear-in establishing position, the output data issued from the shift position sensor when the shifting load is increased to the second shifting load from the lowest load.

11. The shift position detecting device as claimed in claim 10, wherein the shift gear-in establishing position memory section is configured to store, as the data that represents completion of shifting of the gear selection mechanism to the shift gear-in establishing position, the output data that is issued from the shift position sensor at a time when a predetermined time based on a delay in response of the shift actuator passes from a time when the second shifting load instruction section issues the instruction to the shift actuator for increasing the shifting load from the lowest load to the second shifting load.

12. The shift position detecting device as claimed in claim 1, wherein, the shift gear-in establishing position memory section is configured such that, during a time in which the gear selection mechanism is kept in the shift gear-in establishing position by the shift actuator, the shift gear-in establishing position memory section repeatedly reads the output data of the shift position sensor and stores a mean value of the output data as the data that represents completion of shifting of the gear selection mechanism to the shift gear-in establishing position.

13. The shift position detecting device as claimed in claim 1, wherein:
the automotive transmission is configured such that, when the gear selection mechanism is shifted in a first direction to a first shift gear-in establishing position, the gear selection mechanism makes a first gear train operatively established, and when the gear selection mechanism is shifted in a second direction to a second shift gear-in establishing position, the gear selection mechanism makes a second gear train operatively established, and
wherein the control unit is configured to increase the shifting load produced by the shift actuator when the gear selection mechanism is shifted in the first direction and reduce the shifting load produced by the shift actuator when the gear selection mechanism is shifted in the second direction.

14. The shift position detecting device as claimed in claim 13, wherein the control unit is configured to, with the aid of the first and second shifting load instruction sections, repeatedly and alternatively make the shifting of the gear selection mechanism in the first direction to the first shift gear-in establishing position and the shifting of the gear selection mechanism in the second direction to the second shift gear-in establishing position to thereby cause the shift position sensor to produce a first group of output data for the first shift gear-in establishing position and a second group of output data for the second shift gear-in establishing position.

15. The shift position detecting device as claimed in claim 14, wherein the shift gear-in establishing position memory section of the control unit is configured to store the largest one of the first group of output data as an information data that represents completion of shifting of the gear selection mechanism to the first shift gear-in establishing position and store the smallest one of the second group of output data as an information data that represents completion of shifting of the gear selection mechanism to the second shift gear-in establishing position.

16. The shift position detecting device as claimed in claim 1, wherein the gear selection mechanism comprises:
first and second output gears each constituting part of the corresponding gear train; and
a coupling sleeve axially movably arranged between the first and second output gears, the coupling sleeve being configured to make the gear train of the first output gear operatively established when engaged with the first output gear and make the gear train of the second output gear operatively established when engaged with the second output gear, the coupling sleeve being movable by the shift actuator.

17. The shift position detecting device as claimed in claim 16, wherein the shift position sensor comprises:
a permanent magnet;
a magnet supporting structure that extends between the permanent magnet and a shift fork of the coupling sleeve, so that the permanent magnet moves together with the shift fork; and
a magnetic sensor fixed to a fixed portion of the transmission for sensing a magnetic flux produced by the permanent magnet,
wherein the first shifting load is a load that induces a certain warping of the magnet supporting structure when applied to the coupling sleeve, and
wherein the second shifting load is a load that induces substantially no warping of the magnet supporting structure when applied to the coupling sleeve.

18. A method for use in an automotive transmission including a plurality of gear trains and a gear selection mechanism for each gear train, the gear selection mechanism being shiftable to a shift gear-in establishing position of one of the plurality of gear trains by a shift actuator to thereby select a corresponding gear train as a power transmission gear train, the method comprising:
providing a shift position sensor configured to produce output data that represents a shift position of the gear selection mechanism;
issuing an instruction to control the shift actuator to shift the gear selection mechanism to the shift gear-in establishing position using a first shifting load;
after completion of shifting of the gear selection mechanism to the shift gear-in establishing position by the first shifting load, issuing an instruction to control the shift actuator to reduce the shifting load from the first shifting load to a second shifting load which is lower than the first shifting load; and
storing an output data issued from the shift position sensor when the shift actuator is controlled by the second shifting load, as data that represents completion of shifting of the gear selection mechanism to the shift gear-in establishing position.

* * * * *